United States Patent
Morgan (10) Patent No.: US 11,781,592 B2
(45) Date of Patent: Oct. 10, 2023

(54) SYSTEM AND METHOD FOR MAGNETIC BEARINGS

(71) Applicant: DAIKIN INDUSTRIES, LTD., Osaka (JP)

(72) Inventor: Jeff A. Morgan, Plymouth, MN (US)

(73) Assignee: Daikin Industries, Ltd., Osaka (JP)

( * ) Notice: Subject to any disclaimer, the term of this patent is extended or adjusted under 35 U.S.C. 154(b) by 277 days.

(21) Appl. No.: 16/906,797

(22) Filed: Jun. 19, 2020

(65) Prior Publication Data

US 2021/0396242 A1 Dec. 23, 2021

(51) Int. Cl.
| | |
|---|---|
| F16C 32/04 | (2006.01) |
| F25B 1/04 | (2006.01) |
| H02K 1/28 | (2006.01) |
| F16D 1/08 | (2006.01) |
| F04D 29/058 | (2006.01) |

(52) U.S. Cl.
CPC ...... F16C 32/0476 (2013.01); F16C 32/0457 (2013.01); F16C 32/0461 (2013.01); F16D 1/0858 (2013.01); F25B 1/04 (2013.01); H02K 1/28 (2013.01); F04D 29/058 (2013.01); F16C 2226/12 (2013.01); F16C 2360/00 (2013.01); F16C 2360/44 (2013.01)

(58) Field of Classification Search
CPC .............. F16C 32/0476; F16C 32/0457; F16C 32/0461; F16C 2226/12; F16C 2360/00; F16D 1/0858; F25B 1/04; H02K 1/28
See application file for complete search history.

(56) References Cited

U.S. PATENT DOCUMENTS

| | | | |
|---|---|---|---|
| 8,901,796 B2 | 12/2014 | Matsushita et al. | |
| 10,280,643 B2 | 5/2019 | Chase | |
| 2003/0147723 A1* | 8/2003 | Schwab | F16B 21/20 |
| | | | 267/159 |
| 2017/0268806 A1 | 9/2017 | Knopp et al. | |
| 2019/0257355 A1 | 8/2019 | Tangudu et al. | |
| 2019/0288587 A1* | 9/2019 | Klassen | H02K 1/146 |

FOREIGN PATENT DOCUMENTS

| | | |
|---|---|---|
| DE | 10 2008 034 552 A1 | 2/2010 |
| EP | 1 335 147 A2 | 8/2003 |
| JP | 2011151968 A * | 8/2011 |
| JP | 5689550 B2 | 3/2015 |
| WO | 2013/152061 A2 | 10/2013 |

OTHER PUBLICATIONS

JP2011151968A English translation (Year: 2023).*
The International Search Report for the corresponding international application No. PCT/JP2021/023214, dated Sep. 22, 2021.
Zackary W. Whitlow, Roger L. Fittro, Carl R. Knospe, Segmented Magnetic Thrust Bearings: Analytic Models and Predictions of Significant Improve in Dynamic Performance.

* cited by examiner

*Primary Examiner* — Christopher M Koehler
*Assistant Examiner* — Viswanathan Subramanian
(74) *Attorney, Agent, or Firm* — Global IP Counselors, LLP (57) ABSTRACT

A compressor assembly is provided. Embodiments of the present disclosure generally relate to compressors used in chiller air conditioning systems for indoor spaces. The disclosed compressors have magnetic bearings that support rotating components. In one embodiment, the compressor comprises a partially segmented thrust bearing stator core. Additional systems, devices, and methods are also disclosed.

11 Claims, 5 Drawing Sheets

SYSTEM AND METHOD FOR MAGNETIC BEARINGS

BACKGROUND

This section is intended to introduce the reader to various aspects of the art that may be related to various aspects of the presently described embodiments—to help facilitate a better understanding of various aspects of the present embodiments. Accordingly, it should be understood that these statements are to be read in this light, and not as admissions of prior art.

Modern residential and industrial customers expect indoor spaces to be climate controlled. In general, heating, ventilation, and air-conditioning ("HVAC") systems circulate an indoor space's air over low-temperature (for cooling) or high-temperature (for heating) sources, thereby adjusting the indoor space's ambient air temperature. HVAC systems generate these low- and high-temperature sources by, among other techniques, taking advantage of a well-known physical principle: a fluid transitioning from gas to liquid releases heat, while a fluid transitioning from liquid to gas absorbs heat.

In a typical residential system, a fluid refrigerant circulates through a closed loop of tubing that uses compressors and other flow-control devices to manipulate the refrigerant's flow and pressure, causing the refrigerant to cycle between the liquid and gas phases. These phase transitions generally occur within the HVAC's heat exchangers, which are part of the closed loop and designed to transfer heat between the circulating refrigerant and flowing ambient air. This is the foundation of the refrigeration cycle. The heat exchanger where the refrigerant transitions from a gas to a liquid is called the "condenser," and the condensing fluid releases heat to the surrounding environment. The heat exchanger where the refrigerant transitions from liquid to gas is called the "evaporator," and the evaporating refrigerant absorbs heat from the surrounding environment.

For commercial applications, centrifugal chillers are an economical way to control the indoor climate of large indoor spaces. Within a typical chiller system, multiple fluid loops cooperate to transfer heat from one location to another. At the core of a typical chiller is the refrigerant loop that circulates a fluid refrigerant transitioning between liquid and gaseous phases, to effect the desired absorption or release of heat. This is similar to traditional residential systems. But instead of the refrigerant transferring or absorbing heat directly to or from the surrounding or circulating air, chillers often employ loops of circulating water to which or from which heat is transferred. To cool the building, the refrigerant loop's evaporator may be designed to absorb heat from water circulating in a chilled-water loop that, in turn, absorbs heat from the indoor environment via a heat exchanger in an air-handling unit. And the refrigerant loop's condenser may be designed to release heat from the circulating refrigerant to water circulating in a cooling-water loop that, in turn, releases heat to the outdoor environment via a heat exchanger in a cooling tower.

The circulation of refrigerant within the refrigerant loop can be, in part, motivated by a centrifugal compressor that receives low-pressure mostly gaseous refrigerant at a low temperature and, using a rotating impeller, compresses the refrigerant to increase that refrigerant's pressure and temperature. The impeller is rotated by a motor. More specifically, typical motors have a shaft extending through and coupled to the motor's rotor, and the impeller is typically coupled to that shaft. Thus, rotation of the motor rotor causes rotation of the impeller.

Support bearings support the shaft and, in turn, the motor rotor, allowing the motor rotor to rotate with respect to the stationary motor stator surrounding the motor rotor. Often, the support bearings are ball bearing systems in which balls housed between an inner and outer race allow the two races to rotate with respect to one another. This is a mechanical arrangement, and motivation energy provided by the motor is often lost due to friction between the bearing's races and balls. Moreover, the mechanical interaction between the races and the balls can cause unwanted wear on the bearing's components. And these negatives are amplified in larger chiller compressors, which may rotate at relatively high speeds for long durations. This often means the mechanical parts must be lubricated by a costly and complex lubrication system.

Certain chillers use magnetic bearings—rather than mechanical bearings—to facilitate the rotation of the shaft and motor rotor. Put differently, opposing magnetic fields are used to balance the shaft in the axial and radial directions with respect to the stator. Magnetic bearings do not have frictional losses and mechanical wear like ball bearing systems. But they do have some energy losses. For example, magnetic bearings are typically kept in balance by frequently changing magnetic fields that work to balance out forces on the shaft due to operation. And these changes to the field induce eddy currents that reduce the compressor's overall operational efficiency and performance.

Eddy currents can be reduced by segmenting the bearing core, or forming the bearing core from laminated plates—instead of forming the core from a single piece. However, disuniting the bearing into multiple pieces—in the hopes of mitigating eddy currents—bring its own challenges.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to a magnetic thrust bearing assembly with a partially segment stator core. In some embodiments, the magnetic thrust bearing assembly comprises an annular stator core configured to support electrical windings. The stator core comprises a plurality of grooves extending partially and radially through the stator core. In other embodiments, a compressor comprises a shaft and a magnetic thrust bearing configured to support rotation of the shaft. The magnetic thrust bearing also comprises an annular stator core that has a plurality of grooves that extend partially and radially through the stator core.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Figure 1:
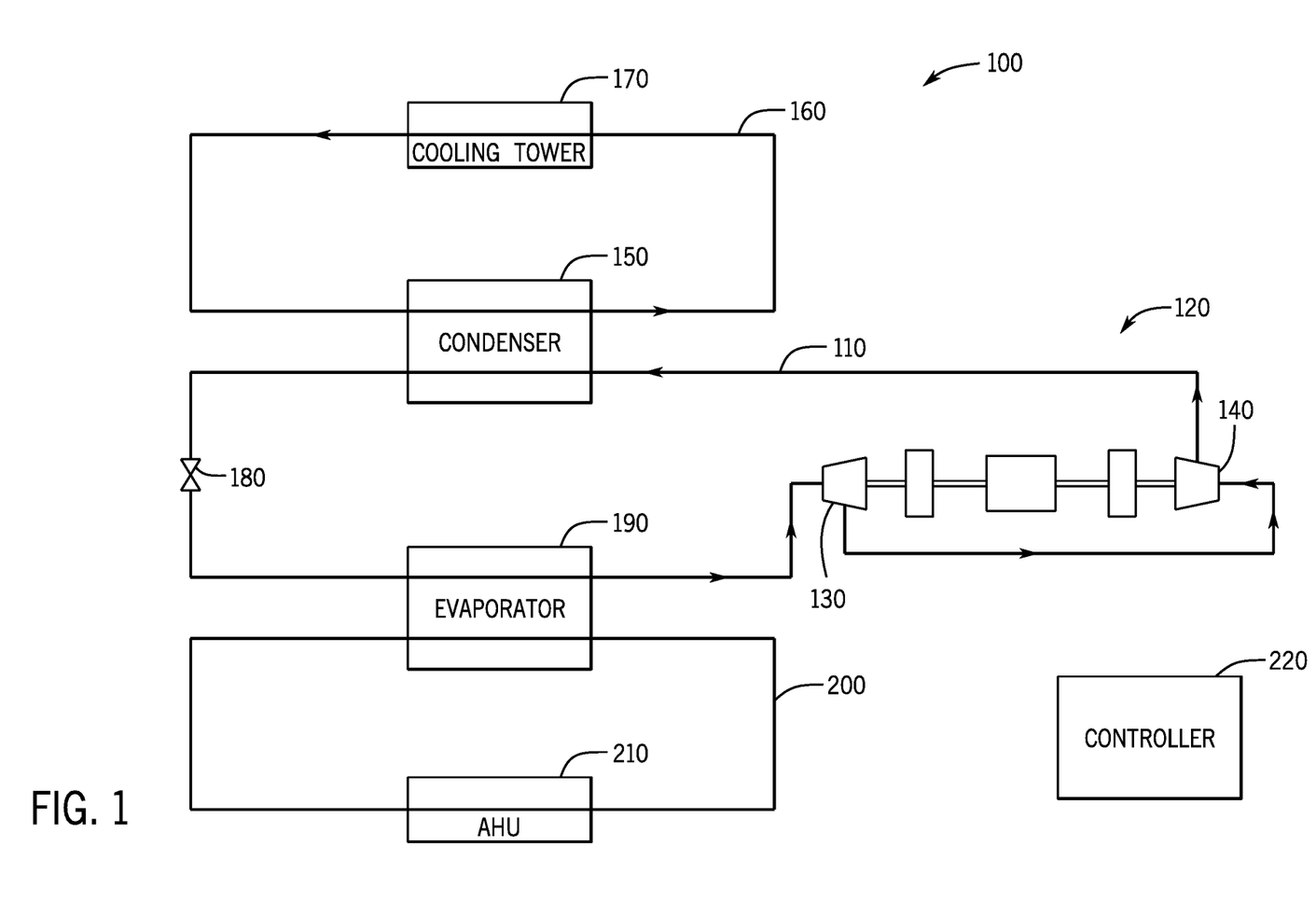
FIG. 1 illustrates schematically a chiller system for a building, in accordance with one embodiment of the present disclosure.

Turning now the figures, FIG. 1 illustrates an overview of a chiller system 100. At the system's center is a refrigerant loop 110. A compressor 120 converts a relatively cool low-pressure refrigerant gas into a hot high-pressure gas. As illustrated, the compressor 120 is a two-stage compressor: The low-pressure refrigerant is pressurized via a first stage impeller 130, and the refrigerant outputted from the first stage impeller is received by a second stage impeller 140 for further pressurization. It is envisaged that certain embodiments may employ a single stage compressor or a variety of compressors with various stages. And it is envisaged that the refrigerant could be any number of refrigerants, including R410A, R32, R454B, R452B, R125, R466A, R1233zd, R1233zd(E), R1234ze, R134a, R513A, R515A, R515B, and R1234yf, or any number of combinations and blends thereof in a variety of percentages.

The hot high-pressure gas then transitions into a high-pressure liquid refrigerant in the condenser 150. During this step, heat expelled from transitioning the high-pressure gas is transferred to the water circulating in a cooling water-loop 160, often through a heat exchanger in the condenser 150. Ultimately, the heat transferred to the water in the cooling-water loop 160 is expelled to the outdoor environment via another heat exchanger in a cooling tower 170.

The now-liquid refrigerant leaving the condenser 150 in the refrigerant loop transitions into a low-pressure liquid when it passes through an expansion valve 180. The refrigerant's drop in pressure also reduces its temperature, making it a low-pressure, low-temperature liquid. The cool low-pressure liquid then enters the evaporator 190 where heat is transferred back into the refrigerant, converting the refrigerant into back into a low-pressure gas to be compressed by the compressor. The heat transferred to the refrigerant in the evaporator 190 is provided by water circulating in a second chilled-water loop 200, often through a heat exchanger in the evaporator 190. The chilled-water loop 200 carries the now-cooled water to air-handling units (AHUs) 210 that circulate the building's indoor air over a heat exchanger, to cool the indoor space.

To coordinate the operation, the system 100 may include a controller that provides a human machine interface. The controller 220—which may wirelessly communicate over any number of wireless protocols, such as WiFi, short distance RF signals (such as the Bluetooth® signal protocols available from the Bluetooth SIG organization), or via wire using wired protocols, such as BacNET, CAN, or a proprietary control logic like P1/P2 or S21—can control operation of the compressor, the magnetic bearing in the compressor, and various other flow control components in the chiller system, to name but a few. Moreover, the controller may be connected to the internet and provide for cloud-based or network operation from a remote location.

Figure 2:
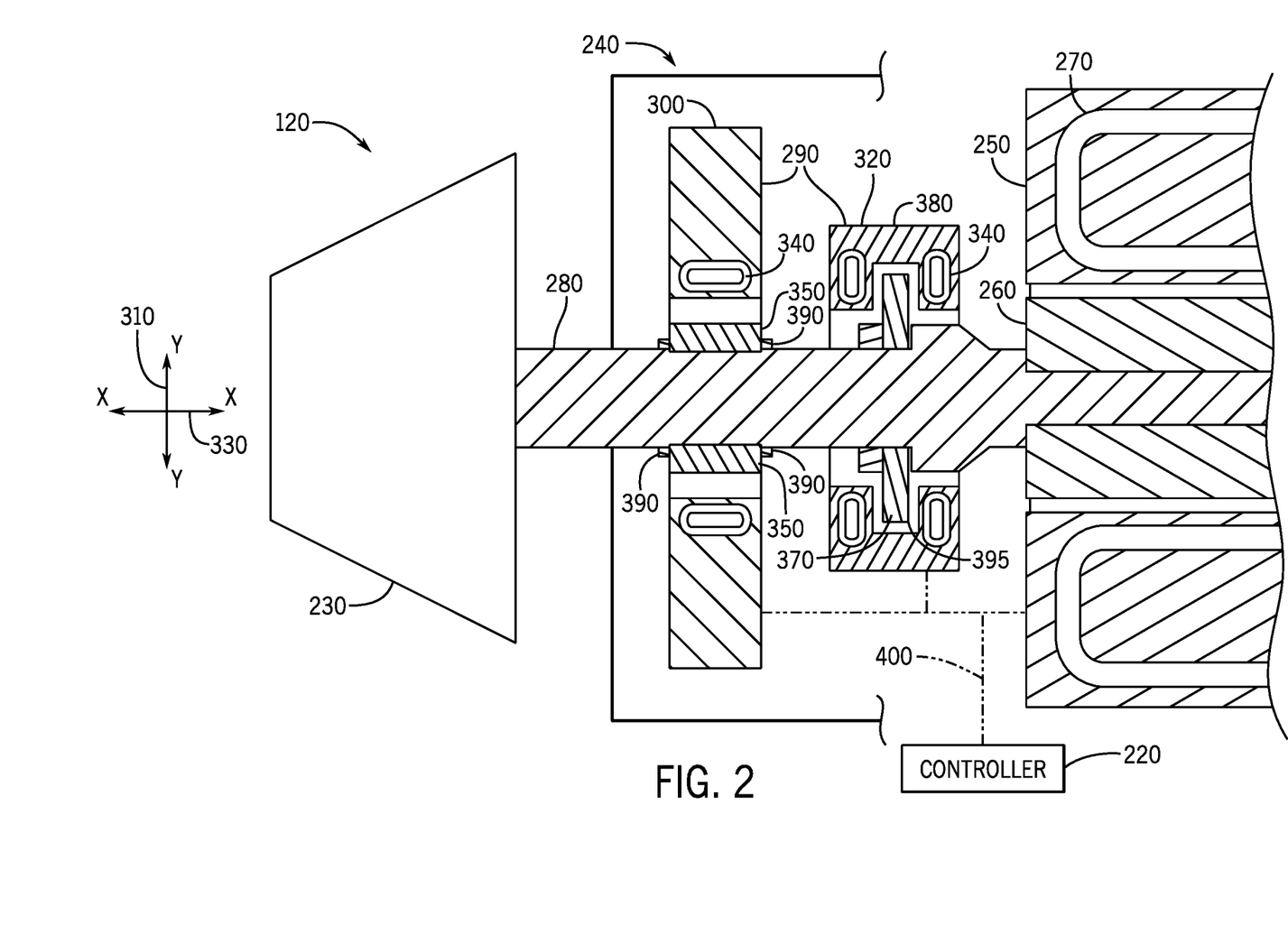
FIG. 2 illustrates schematically a cross section of a compressor assembly, in accordance with one embodiment of the present disclosure.

FIG. 2 focuses on an exemplary compressor assembly for a chiller shown in schematic cross section. (For ease of discussion, only a portion of the compressor is shown.) As discussed above, the compressor receives low-pressure, low-temperature refrigerant that, through rotation of the impeller 230, is transitioned to a high-pressure, high-temperature condition.

To effect the impeller's rotation, the compressor assembly 120 includes a motor assembly 240, which may be any number of types of motors, such as a hydraulic, pneumatic, or electric motor. As illustrated, the compressor assembly 230 employs an electric motor assembly 240 with a stationary annular stator 250 and a rotating rotor 260 disposed inside the annular stator. The motor's stator and rotor cooperate to convert electric current into rotational motion, as is well known in the industry. Advantageously, the controller 220 can provide and receive signals from the compressor 120 to optimize its operation. For example, the controller may send controls signals and coordinate with a power source to send current to electrical wiring (such as wound coils 270) in the stator 250 that, when appropriately energized, generate a changing magnetic flux that causes the magnetic rotor 260 to rotate. And the controller 220 can be configured to coordinate with a power source that provides pulse-width-modulated current to the wound coils. The pulse-width modulated current can be generated through the use of appropriate conditioning circuitry that, for example, converts an ac current into a dc current, and that helps modulate the duration of dc current to emulate an ac waveform of varying frequencies. The controller may also be part of a building management system sends and receives signals to and from the building, such that the chiller system's operation can be optimized.

A shaft 280 extending through and coupled to the rotor 260 rotates with the rotor 260. And the shaft's rotation is imparted onto the impeller 230, which is mechanically coupled to the shaft. In certain embodiments, a gear assembly may be interposed between the shaft and impeller, to coordinate or change the rotational speed of the shaft with respect to the impeller. However, as illustrated, the shaft 280 is directly driven by the motor assembly, such that the rotational speed of the shaft and the impeller are matched.

The shaft 280, and the rotor 260 it is attached to, is supported by bearings 290. In the illustrated embodiment, the bearings 290 are annular magnetic bearings that surround the shaft 260 and that comprise a radial bearing 300 that supports that shaft in the Y-Y direction 310 and a thrust bearing 320 that supports the shaft in the X-X direction 330. More specifically, the bearings 300, 320 have wound coils that, when energized, produce a magnetic flux that supports the shaft without mechanical contact. For example, the shaft 280 includes a magnetic portion 350 that interacts magnetically with the generated flux for support in the Y-Y direction. This magnetic portion 350 may be integral with the shaft. Or it may be a separate annular component that is mounted to the shaft, as is illustrated. Additionally, as an example, the illustrated shaft 280 carries an annular thrust rotor 370 made from a magnetic material, wherein the thrust rotor 370 interacts with the magnetic flux generated by the wound coils 340 in the thrust stator 380 to control the position of the shaft (and the components mounted on it) in the X-X direction. In the illustrated embodiment, the thrust rotor 370 and the magnetic portion 350 surround the shaft and are positionally secured on the shaft in the X-X direction by annular support rings 390. The thrust rotor is disposed partially within an annular space 395 defined by the thrust stator core.

Advantageously, the controller 220 may provide signals 400 and manage current 400 to the wound coils 340 of the magnetic bearings, thereby controlling the amount of flux produced by the coils and, in turn, stabilizing the position of the shaft in the compressor assembly when the shaft is rotating.

Figure 3:
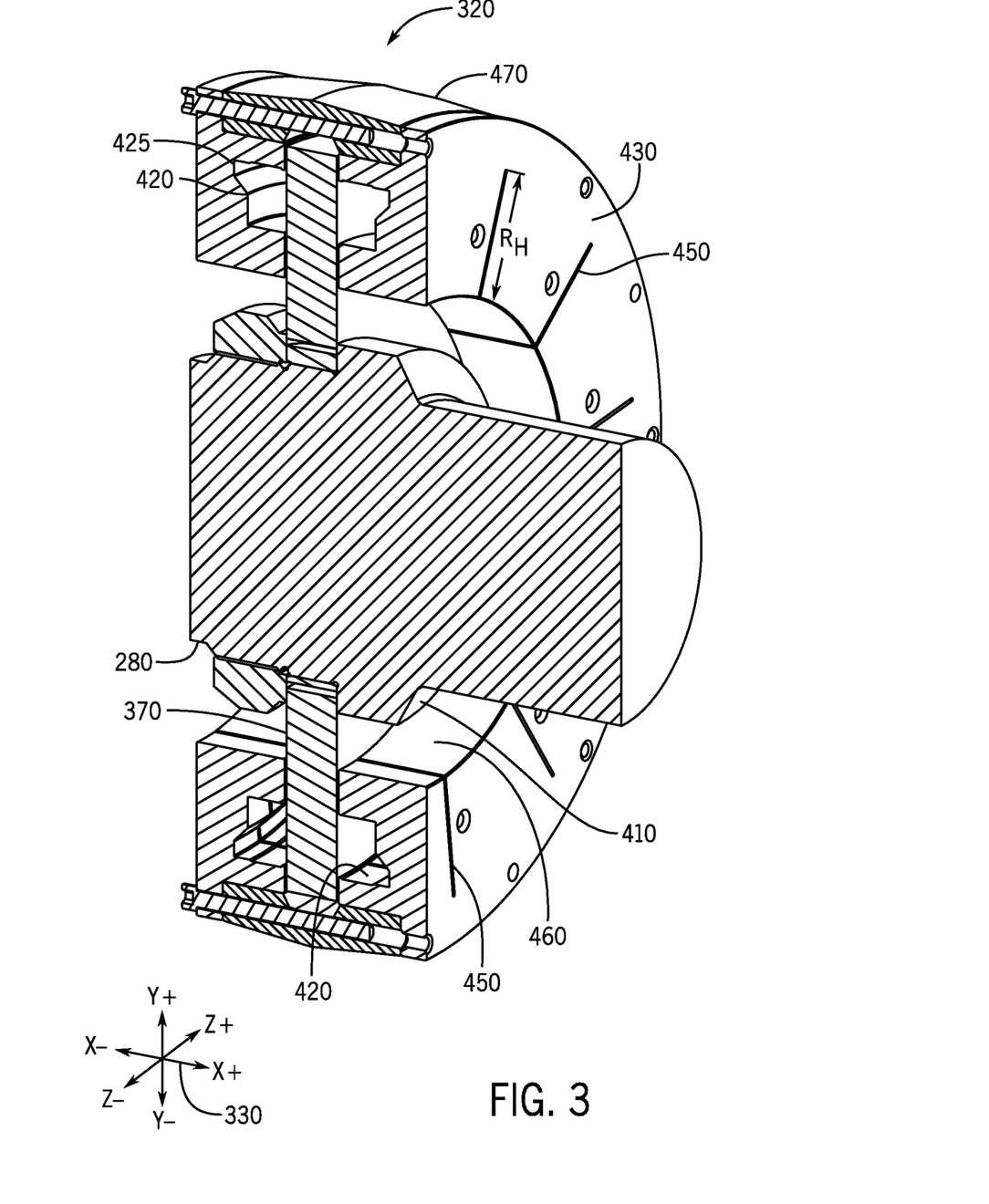
FIG. 3 illustrates schematically an isometric cross section of a magnetic thrust bearing assembly surrounding a shaft, in accordance with one embodiment of the present disclosure.

FIG. 3 focuses on the thrust bearing assembly 320, which is illustrated schematically, isometrically, and in cross section. As shown, the annular thrust bearing assembly 320 surrounds the shaft 280 and uses generated magnetic flux to support the shaft 280 in the X-X direction. Mounted directly to the shaft 280 is the thrust rotor 370, which is secured positionally to the shaft in the X-X direction 330 by a shoulder 410 on one side and a support ring 390 (see FIG. 2) on the other. As discussed above, the thrust rotor 370 rotates with the shaft.

During this rotation, axial forces (i.e., forces in the X-X direction) may try to move the shaft, which can cause operational issues. The thrust bearing acts to counteract these operational forces and keep the shaft in proper position. Wound coils (not shown) disposed in coil housings 420, which are annular spaces in the thrust stator (more specifically in the thrust stator core 430), act to provide counteracting magnetic force to keep the thrust rotor 370 in proper position. For example, the coils on the X+ side (in reference to the axes shown in FIG. 3) may provide a flux that drives the thrust rotor in the X− direction. Conversely, the coils on the X− side of may provide flux that drives the thrust rotor in the X+ direction. By adjusting the flux in each of the wound coils, the thrust rotor is positionally stabilized in the X-X direction.

However, when the wound coils generate this flux, eddy currents may form in the thrust bearing, specifically in the thrust bearing core. And these eddy currents can indirectly lead to the operational efficiency of the compressor to decline. For example, eddy currents can cause the frequency response to be reduced (i.e., the reduction in lag of the bearing's induced force to rapid fluctuations in the control current). And this, in turn, makes it more difficult to operate the compressor at or near the surge boundary where the compressor is believed to operate most efficiently.

The production and density of eddy currents can be reduced by fully segmenting the thrust stator core 430. That is, the thrust stator core 430 can be comprised of multiple, pie-shaped, and separate stator cores segments (not shown) that are then mechanically assembled to form the annular thrust stator core 430. Unfortunately, when this is done, misalignments and other factors related to poor assembly can occur. And fully segmented stator cores can be difficult to manufacture.

Figure 6:
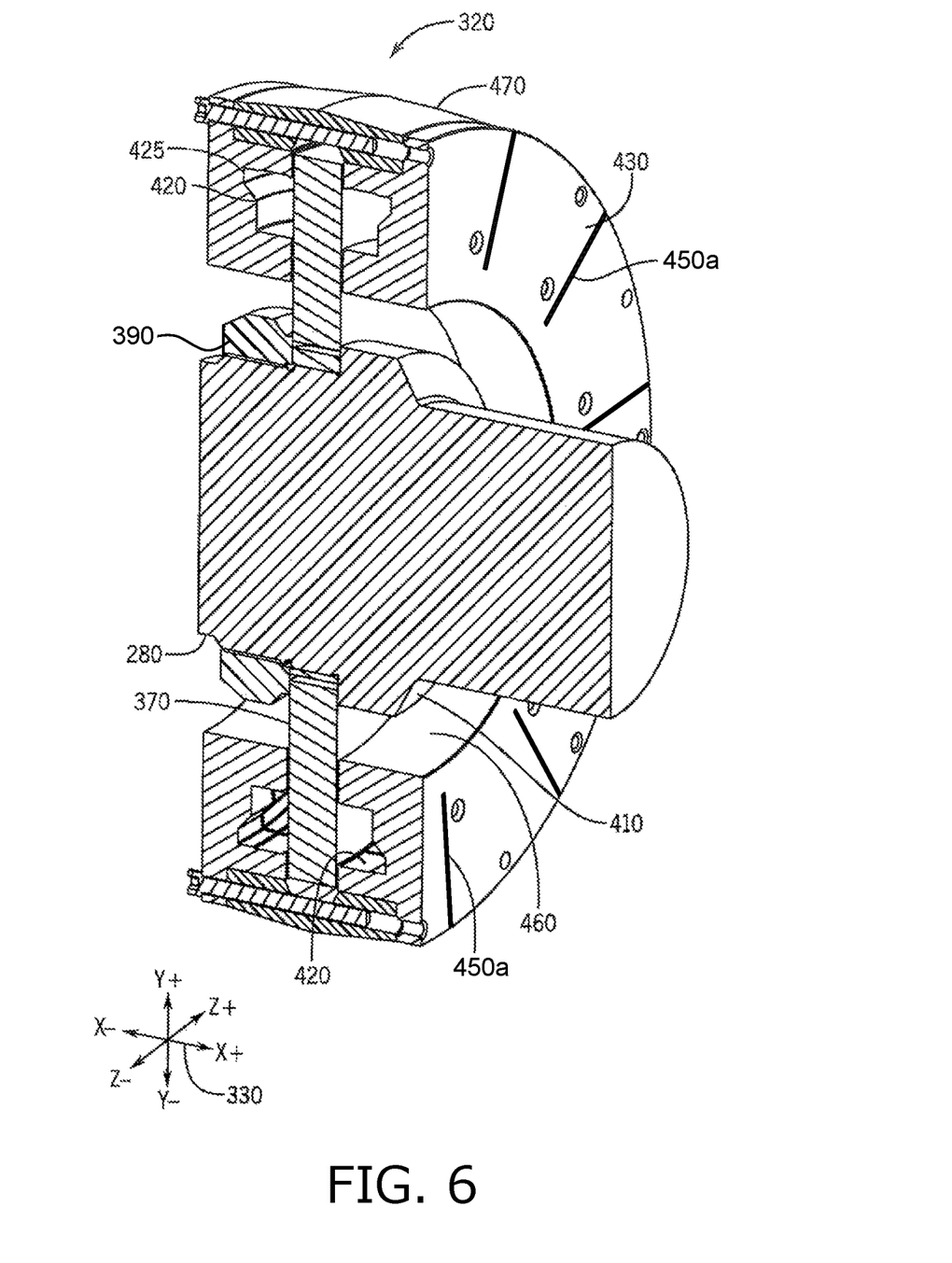
FIG. 6 illustrates schematically an isometric cross section of a magnetic thrust bearing assembly surrounding a shaft in which a plurality of grooves extend from a radially outermost external surface of a thrust stator core and toward a radially innermost external surface of the thrust stator core.

In accordance with one embodiment, eddy currents are believed to be reduced without the need for segmenting or laminating (i.e., made of laminations) of the thrust stator core 430. In this embodiment, as illustrated in FIG. 3, the thrust stator core 430 comprises a plurality of grooves 450 that extend radially and partially through the annular thrust stator core 430. The grooves 450 begin on and extend axially across the radially inward external surface 460 of the thrust stator core 430 and also extend radially through the thrust stator core, but not as so far as to reach the radially outward external surface 470 of the thrust stator core. In other embodiments, as shown in FIG. 6, the grooves 450a extend from the radially outward-most external surface 470 and radially though the stator core, but not as so far as to reach the radially inner-most external surface 460.

In either embodiment, the groove creates a gap between adjacent portions of the thrust stator core while leaving the thrust stator core as a one-piece assembly or unitary body, which stator cores are believed to be easier to manufacture using traditional casting processes and less expensive materials such as AISI 1008 low-carbon steel. And by having a gap but still providing the stator in one piece, the illustrated thrust stator core can be partially segmented.

The grooves are also believed to reduce the production of eddy currents and, in turn, facilitate more efficient operations when rapidly fluctuating currents are applied, such as during surge and trip operations. Indeed, it is believed the grooves improve the dynamic load capabilities of the thrust bearing, making the compressor more suitable for harsh and aggressive operating environments or performance requirements. Moreover, the grooves increase the bearing's surface area, and that increased surface area helps with heat dissipation.

In one embodiment, the radial height of the groove RH is matched to the expected location of eddy currents in the thrust stator core. For example, it is believed that eddy currents tend to form on the inner surfaces of the stator core 430, with the highest density of eddy currents occurring near the outward corners 425 of the coil housing 420. Accordingly, the height of the groove RH may be correlated with the radial distance of corners 425 from the innermost external surface 460. In one example, the radial height of the corner 425 from the innermost external surface 460 may be the same as and close to the height of the groove RH.

In certain embodiments, various compressor components mounted to the shaft may be positionally secured in the axial direction via one or more support rings 390 (see FIG. 2). However, during maintenance, for instance, it may be necessary or beneficial to remove components that have been mounted to the shaft. In such cases, the support ring is axially removed from the shaft so that the secured component (e.g., the magnetic portion 350, thrust rotor 390) can be decoupled from the shaft.

Because the support ring 390 rotates with the shaft and secures the other rotating components, there is benefit in having a tight friction fit or coupling between the shaft and support ring. But that tight fit becomes a determinant during, for instance, maintenance operations, when the tight fit makes it more difficult to remove the support ring.

Figure 4:
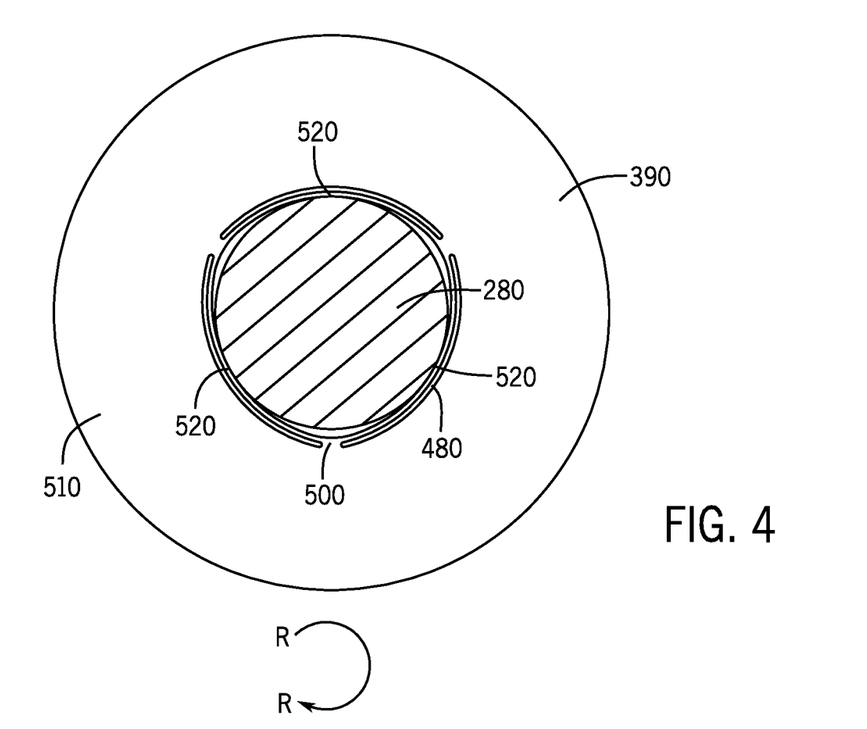
FIG. 4 illustrates schematically an axial cross section of a support ring mounted to a shaft, in accordance with one embodiment of the present disclosure.
Figure 5:
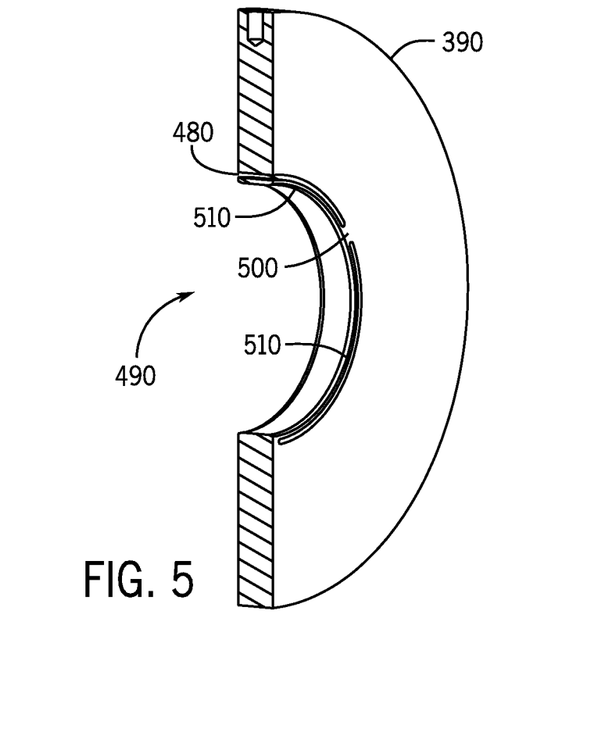
FIG. 5 illustrates schematically and isometrically a cross section of a support ring, in accordance with one embodiment of the present disclosure.

Advantageously, in accordance with one embodiment, the support ring includes features that lessen the friction forces between the shaft and support ring when the shaft is not rotating but increase those friction forces when the shaft is rotating. FIGS. 4 and 5 illustrate exemplary support rings 390 with such features. The illustrated support rings include slots 480 located proximate to shaft aperture 490—i.e., toward the radially inward external surface. These slots 480, in conjunction with supports 500, help define relatively thin (in the radial direction) mounting portions 510 that contact the shaft to establish the friction fit between the shaft and the support ring.

In FIG. 4, the support ring 390 is illustrated in the operating condition, where the shaft and mounted support ring are rotating in direction R-R. During rotation, the thin mounting portions 510 deform asymmetrically due to centrifugal forces. This causes areas of the mounting portion 510 to move radially away (outward) from the shaft, but the contact surfaces 520—which are typically at the midpoints of the mounting portions between the supports—move radially toward (inward) the shaft, improving the overall the friction or interference fit between the support ring and the shaft. But when the shaft is stationary, the support ring returns to its more nondeformed, more circular configuration, where more of the mounting portions contact the shaft but the friction or interference fit is lessened, making it easier to remove the support ring from the shaft.

There are number of refrigerants that can be used by the disclosed chiller system. For example, the system 100 may circulate a single refrigerant, such as R32. Or the system may employ a blend of multiple refrigerants. For example, the system may employ refrigerants with the following composition (by weight):

| Composite Refrigerant | R32 (% weight) | R125 (% weight) | R1234yf (% weight) |
| --- | --- | --- | --- |
| R452B | 67.0 | 7.0 | 26.0 |
| R410 | 50.0 | 50.0 | 0.0 |
| R454B | 72.5 | 0.0 | 27.5 |

As an another potential embodiment, the system may employ a hydrofluoro-olefin (HFO) refrigerant. The employed HFO refrigerant may by of a single type or a composite. For example, the system may employ HFO refrigerants with the following composition (by weight):

| Composite Refrigerant | HFO-1123 (% weight) | R32 (% weight) |
| --- | --- | --- |
| HFO-Mix 1 | 45.0 | 55.0 |
| HFO-Mix 2 | 40.0 | 60.0 |

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims. For example, it is envisaged that the embodiments described herein could be applicable to magnetic bearing systems used outside of chiller compressors, including magnetic bearings used in motors for other industrial purposes.

The invention claimed is:

1. A compressor to increase the pressure of a fluid refrigerant, the compressor comprising:
   a magnetic thrust bearing configured to support rotation of a shaft, wherein the magnetic thrust bearing comprises:
   an annular thrust stator core that has a plurality of grooves extending partially and radially through the thrust stator core; and
   an annular thrust rotor; the annular thrust rotor being disposed at least partially within an annular space defined by the thrust stator core;
   the shaft extending through the thrust rotor,
   the annular thrust stator core having an innermost external surface facing the annular thrust rotor and an outermost external surface disposed on an opposite side of the innermost external surface in an axial direction extending along the shaft,
   each of the plurality of grooves extending continuously from the outermost external surface to the innermost external surface, and
   each of the plurality of grooves extending radially to at least an annular coil housing, the annular coil housing being an annular space in the annular thrust stator core in which wound coils are configured to be disposed.

2. The compressor of claim 1, wherein
   the compressor is in fluid communication with a refrigerant loop that circulates the fluid refrigerant, and wherein refrigerant loop is configured to exchange thermal energy with a circulating loop of water.

3. The compressor of claim 2, wherein
   the fluid refrigerant is R32, R134A, R452B, R454B, R513A, R515A, R515B, R466A, R1233zd, R1233zd (E) or a refrigerant blend comprising HF0-1234yf.

4. The compressor of claim 1, comprising a controller configured to control the emulated frequency of pulse-width-modulated power from a power source.

5. The compressor of claim 1, wherein
   the radial height of at least one of the plurality of the groove is substantially the same as the radial height of the location in the thrust stator core with the highest density of eddy currents.

6. The compressor of claim 1, wherein
   the plurality of grooves extend from a radially innermost external surface of the thrust stator core and toward a radially outermost external surface of the thrust stator core.

7. The compressor of claim 1, wherein
the plurality of grooves extend from a radially outermost external surface of the thrust stator core and toward a radially innermost external surface of the thrust stator core.

8. The compressor of claim 1, comprising a support ring disposed radially outboard of the shaft, wherein the support ring comprises a plurality of slots that partially define a mounting portion configured to press radially inward against the shaft during rotation of the shaft.

9. The compressor of claim 1, wherein each of the plurality of grooves extends radially to approximately an outward corner of the annular coil housing.

10. A magnetic thrust bearing assembly, comprising:
an annular stator core configured to support electrical winding, wherein the stator core comprises a plurality of grooves extending partially and radially through the stator core,
the annular thrust stator core having an innermost external surface facing an annular thrust rotor and an outermost external surface disposed on an opposite side of the innermost external surface in an axial direction extending along the shaft,
each of the plurality of grooves extending continuously from the outermost external surface to the innermost external surface, and
each of the plurality of grooves extending radially to at least an annular coil housing, the annular coil housing being an annular space in the annular thrust stator core in which the electrical winding is configured to be disposed.

11. The compressor of claim 10, wherein each of the plurality of grooves extends radially to approximately an outward corner of the annular coil housing.

\* \* \* \* \*